United States Patent [19]

Miller

[11] 4,293,060

[45] Oct. 6, 1981

[54] ELECTROMAGNETIC FRICTION CLUTCH WITH OVERLOAD RELEASE

[75] Inventor: Donald L. Miller, Horseheads, N.Y.

[73] Assignee: Facet Enterprises, Inc., Tulsa, Okla.

[21] Appl. No.: 954,372

[22] Filed: Oct. 24, 1978

[51] Int. Cl.³ .................... F16D 7/02; F16D 27/10
[52] U.S. Cl. ......................... 192/56 R; 192/84 C; 192/150
[58] Field of Search .............. 192/56 R, 84 C, 89 B, 192/150

[56] References Cited

U.S. PATENT DOCUMENTS

| | | | |
|---|---|---|---|
| 1,887,776 | 11/1932 | Morral | 192/89 B |
| 2,209,155 | 7/1940 | Fagg | 192/150 |
| 2,407,757 | 9/1946 | MacCallum | 192/89 B |
| 2,881,891 | 4/1959 | Birkland et al. | 192/56 R X |
| 3,095,955 | 7/1963 | Orwin | 192/56 R |
| 3,282,387 | 11/1966 | Becker et al. | 192/56 R X |
| 3,305,058 | 2/1967 | Orwin et al. | 192/150 X |
| 3,429,407 | 2/1969 | Orwin et al. | 192/56 R |
| 3,478,182 | 11/1969 | Littmann | 192/56 R X |
| 3,584,715 | 6/1971 | Miller | 192/56 R |
| 4,079,821 | 3/1978 | Miller | 192/84 C |
| 4,142,616 | 3/1979 | Dekoninck | 192/56 R |
| 4,174,621 | 11/1979 | Woltjen | 192/56 R X |

FOREIGN PATENT DOCUMENTS 571476  1/1958  Italy ........................ 192/150

*Primary Examiner*—Rodney H. Bonck

*Attorney, Agent, or Firm*—Remy J. VanOphem

[57] ABSTRACT

An electromagnetically operated friction clutch is disclosed of the type including an axially movable armature member which is drawn into frictional driving engagement with a friction surface on an inner body to establish drive through the clutch, in which a torque overload deenergization of the electromagnetic coil is provided. The clutch is provided with a torque boosting arrangement in which the drive from the axially movable armature is transmitted through a series of balls disposed in corresponding pockets formed in a radial face of the armature and an opposing radial face of a clutch element drivingly connected to one of the primary clutch members. The action of the balls in the pockets creates a torque boosting effect increasing the engagement pressure exerted on the frictional engagement surfaces. The torque overload release arrangement includes mounting of the clutch element axially and rotationally so as to be restrained by means of a spring element. The axial movement of the clutch element against the spring bias in response to the transmission of a particular level of torque is employed to sense a torque overload condition, and by positioning a microswitch activated by a predetermined extent of axial movement of the clutch element, the electromagnetic coil is deenergized at a predetermined torque level. The clutch may be reenergized at high speed by a manual switch reenergizing the coil relay which draws the friction surfaces into engagement.

7 Claims, 3 Drawing Figures

ELECTROMAGNETIC FRICTION CLUTCH WITH OVERLOAD RELEASE

BACKGROUND OF THE INVENTION

In many clutch applications, it is necessary or desirable to provide clutch overload protection for the equipment being driven by the clutch in order to protect such equipment and/or to insure safe operation of the equipment. Such torque overload protection can provided in a number of differing ways. A clutch designed to slip at a predetermined torque level may provide the necessary protection, but it suffers from the disadvantage that it is relatively difficult to precisely control the torque level at which it slips, and in addition, slip produces excessive wear of the clutch engagement surfaces. Also, these clutches do not disengage cleanly; that is, a certain level of torque will continue to be transmitted by the slipping surfaces.

A torque overload shear pin arrangement, in which the driving members are rendered incapable of transmitting drive by the shear failure of the pin or other element, has the disadvantage that the equipment cannot be reengaged without shut down and replacement of the sheared element.

Other arrangements have included clutches which are caused to disengage by various camming arrangements upon achievement of a predetermined torque level of transmission through the unit. An example of this method is disclosed in U.S. Pat. No. 3,584,715. The disadvantage of this approach is that often the camming arrangement involves the engagement of the camming surfaces of a configuration such as to preclude the reengagement of the clutch at relatively high speeds, due to possible damage to the camming surfaces. This comment applies equally well to applications which utilize tooth type clutches.

A second torque overload feature disclosed in the forementioned U.S. Pat. No. 3,584,715, issued to the present inventor, includes a provision for a torque sensing ring which is caused to be rotated relative to a second ring member against the force of a bias spring. The resultant relative rotation produces an axial movement of the first ring by a sliding movement on a spline member against the bias of a restraining spring. The axial movement, upon continuing for a predetermined extent, triggers a switching arrangement which deenergizes the clutch. While offering many advantages, this particular installation requires a relatively costly torque sensing arrangement, which, in addition to the existing components of the clutch, increases the expenses of manufacture. Furthermore, the axial movement is not entirely friction free and affects the accuracy of maintaining the torque at which the clutch will be deenergized.

Accordingly, it is the object of the present invention to provide a clutch incorporating a torque overload arrangement in which the torque level at which the clutch is released may be precisely controlled.

It is yet another object of the present invention to provide such a clutch in which the clutch may be reengaged at relatively high speeds without damage to the clutch.

It is a still further object of the present invention to provide such a torque overload arrangement which does not necessitate expensive additional components to the basic design of the clutch such as to enable the clutch unit to be manufactured at relatively low cost.

SUMMARY OF THE INVENTION

These and other objects of the present invention, which will become apparent upon a reading of the following specification and claims, are achieved by the provision of an electromagnetically operated friction clutch of the type including an axially movable armature which is moved into engagement with the friction face of a clutch inner body member element by energization of an electromagnetic coil operator and with the movement of the armature into engagement with the inner body friction face establishing drive through the unit. The frictional engagement between the inner body and the armature is boosted by the provision of a plurality of balls disposed in oppositely located pockets formed in a radial face of the armature and a clutch element disposed adjacent the armature having a radial face also provided with conical pockets. The action of the balls in the pockets increases the frictional engagement force between the inner body and the armature. The torque overload arrangement comprises a provision of a mounting of the clutch element to be restrained against axial movement by a spring means and the provision of a microswitch in the circuitry which is utilized to energize the electromagnetic clutch operator, such that, upon relative axial movement of the clutch element, the clutch coil relay is deenergized. Deenergizing the clutch coil discontinues drive through the clutch. The clutch may be reenergized by reenergizing the coil relay, thereby again drawing the armature into frictional engagement with the inner body. The spring means is provided by a spider spring having a plurality of spring arms drivingly engaged to one of the primary clutch members and providing a low friction axial spring force restraining the movement of the clutch element to enable an accurate determination of the release torque level.

Reengagement of the clutch is accomplished by a switch reenergizing the coil relay with the frictional engagement enabling reengagement of the clutch at high speeds.

DETAILED DESCRIPTION OF THE PREFERRED EMBODIMENT

In the following detailed description, certain specific terminology will be employed for the sake of clarity and a particular embodiment described in accordance with the requirements of 35 USC 112, but it is to be understood that the same is not intended to be limiting and, indeed, should not be so construed inasmuch as the invention is capable of taking many forms and variations within the scope of the appended claims.

The general type of electromagnetic torque booster clutch with which the present invention is concerned is disclosed in U.S. Pat. No. 4,079,821. In this design, a drive is established between the primary clutch members by means of an axially movable armature which is drawn into frictional engagement with an inner body by energization of an electromagnetic coil. The torque is transmitted directly through the armature and into a clutch element by means of a plurality of balls located in corresponding conical pockets disposed in radial faces of the armature and clutch element, respectively. This arrangement produces a torque boosting of the torque capacity by the camming action of the balls in the pockets as discussed in detail in the aforesaid patent.

Figure 1:
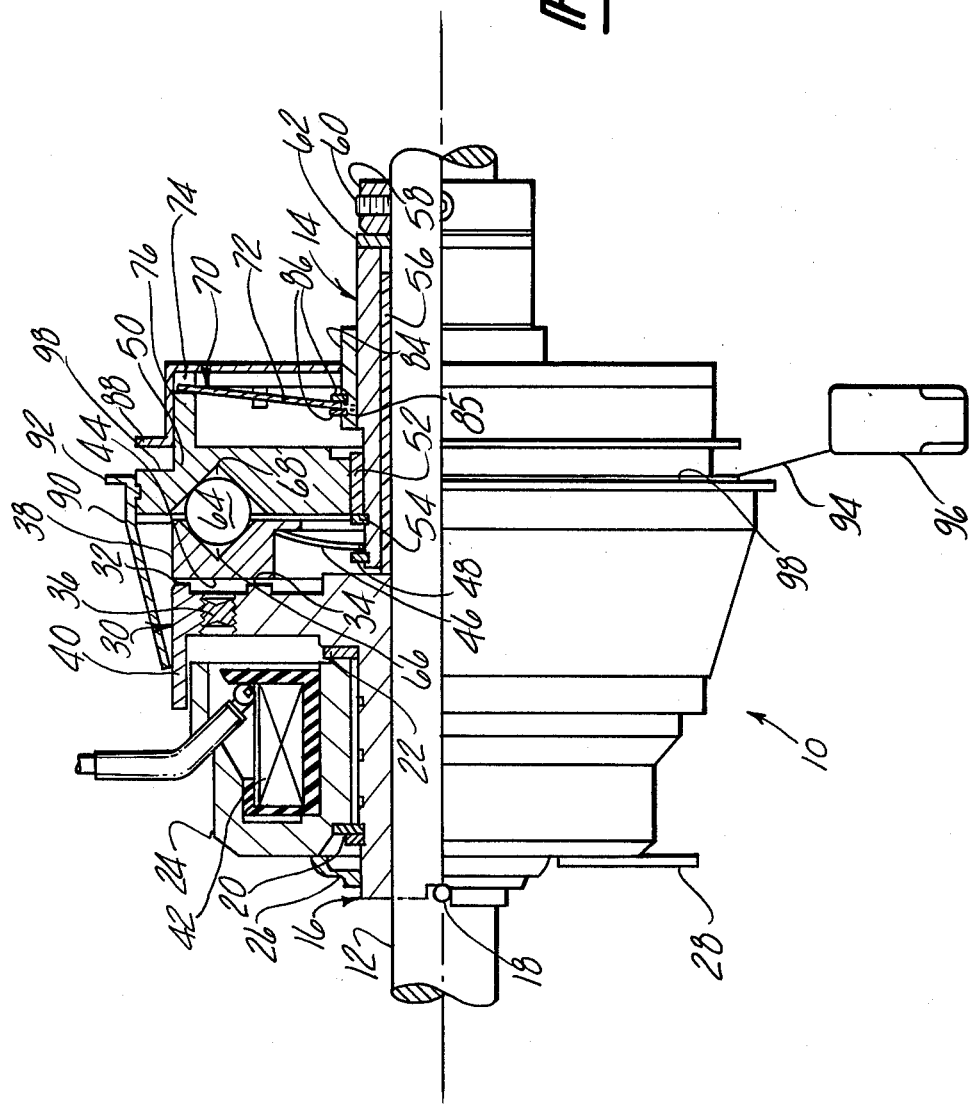
FIG. 1 is a view of an electromagnetically operated friction clutch according to the present invention shown in partial longitudinal section.
Figure 2:
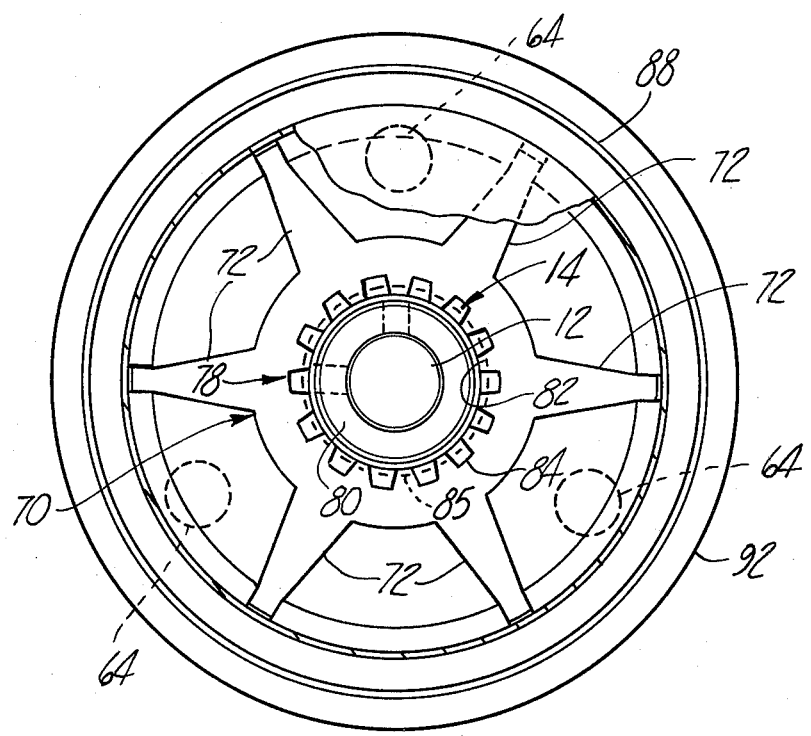
FIG. 2 is an end view of the electromagnetic clutch depicted in FIG. 1.

Referring to the drawings and, particularly to FIGS. 1 and 2, the torque overload clutch 10, according to the present invention, is of this same basic design. The drive is established through the unit between a pair of primary clutch members as here comprised of a shaft 12 and a hub 14. Since either member may be the input or output member, depending on the drive connections to the prime mover and the driven equipment, these elements will be referred to as the clutch primary members between which drive is controllably established by operation of the clutch 10.

Drivingly connected to the shaft 12 is an inner body 16 pinned at 18 to the shaft 12. The inner body 16 is axially located by a snap ring retainer 20 and thrust washer 22 with both engaged with a stationary coil housing 24. The coil housing 24 is restrained against rotation by a strap 28 which may be secured to a stationary mounting structure (not shown). A shield 26 may be provided to prevent the entrance of dust and other contaminants. The shield is secured to the hub section of the inner body 16.

The inner body 16 is provided to the radially extending flange portion 30 in which are formed a pair of radially spaced radial face portions 32 and 34 separated by a ring 36. The inner body 16 is constructed of a ferromagnetic material, while the ring 36 is constructed of a nonferromagnetic material such as to maximize the passage of magnetic flux into an armature member 38. A skirt portion 40 is also formed on the inner body extending back over the coil housing 24. The skirt portion serves to partially shield the interior of the clutch 10, but also serves to further enhance the magnetic flux density passing from an electromagnetic coil 42 mounted within the coil housing 24 into the armature 38.

This arrangement causes a generally toroidal flux pattern passing through the inner body, across the gap between the radially spaced face portions 32 and 34 and thence into the armature 38. The flux pattern causes the radial face 44 of the armature 38, disposed opposite the radial face portions 32 and 34 of the inner body member, into frictional engagement with the face portions 32, 34 upon energization of the electromagnetic coil 42.

The armature 38 is mounted for limited axial movement in order to be drawn into and out of frictional engagement with the inner body 16. The armature moves axially against the bias of a return spring 46. The return spring is mounted for engagement with the armature and is anchored against a snap ring 48 which is secured in the hub member 14.

The driving connection between the armature 38 and the hub member 14, is via a clutch element or back plate 50, supported on the hub member 14 on a sleeve 52, which is located thereon by means of a snap retainer 54. The hub 14 is, in turn, rotatably supported on the shaft 12 by means of a sleeve bearing 56. The hub 14 is axially retained on the shaft 12 by a collar 58 and set screw 60 with a thrust washer 62 in engagement with the end of the hub 14.

A pair of dust shield elements are also provided. One shield 88 is press fitted over the skirt portion 76 of the backing plate 50. The second shield element 90 is staked to the outside diameter of the backing plate 50 and has a terminal flange portion 92.

The driving connection between the armature 38 and the clutch element 50 is by means of a plurality of balls here indicated as three equally spaced balls 64 disposed in corresponding conical pockets 66 and 68 formed in opposing radial faces of the armature 38 and the clutch element 50, respectively. Thus, the entire torque is transmitted through the balls from the armature 38 to the clutch element 50.

The clutch element 50, in turn, is rotatably connected to the hub 14 by means of a spider spring 70. Spider spring 70 has a plurality of arms 72 received in recesses 74 formed in a skirt portion 76 of the clutch element 50. The spider spring 70 has an annular central portion 78 formed with a spline having an interior bore 80 formed with a spline 82 adapted to mate with a corresponding spline 84 formed on the outside diameter portion of the hub 14. Thus, a rotary connection is established between the clutch element 50 and the hub 14 by means of the spider spring 70.

The central portion 78 of the spider spring 70 is restrained from axial movement by a pair of snap rings 86 which are mounted in a circumferential groove 85 in the splines 84 of the hub 14. This mounting arrangement establishes a preload on the spider spring 70 at assembly, as indicated in FIG. 1.

The spider spring 70 is formed of a relatively thin, i.e., 0.020 to 0.022 inches thick spring steel flat stock such as to be relatively resilient to forces imposed thereon in an axial direction. However, the arms 72 are of substantial width to be relatively rigid to torque. Thus, the spider spring 70 constitutes means rotatably connecting the backing plate 50 to the clutch member comprised of the hub 14, while allowing limited axial movement away from the armature 14 thereby creating an axial bias force by deflection of the spider spring arms 72. This limited axial movement is utilized to trigger a torque overload arrangement by keying the triggering of the torque overload release on the axial movement of the backing plate 50.

The spider spring 70 is designed to be of a relatively thin stock to facilitate the selection of the use of the clutch in a very wide range of overload torque release applications. By merely adding more springs, the clutch may be used in applications where the overload torque release is high. The use of more than one spring also has the advantage of not having to be concerned with overstressing a single spring in high torque applications and/or the selection of springs with varying thicknesses.

The sensing of the axial movement is by means of an arm 94 provided on an adjustable microswitch 96. The arm 94 is placed in contact with a radial face 98 formed on the backing plate 50, such that corresponding movement of the microswitch arm 94 is effected.

Figure 3:
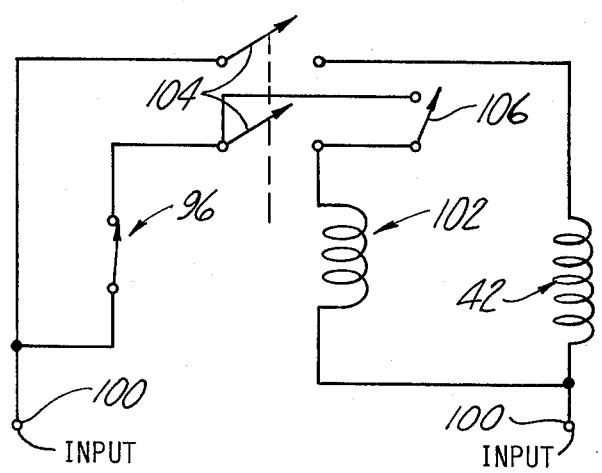
FIG. 3 is a schematic diagram of the control circuit associated with the clutch coil.

The microswitch 96 is interposed in the coil energization circuitry as depicted schematically in FIG. 3. A clutch coil 42 is connected to the source of input voltage next applied to terminals 100 by means of a relay 102 having double poles 104. A manual push start switch 106 energizes the relay 102 pulling in the poles 104 to maintain the energization of the relay coil 102 as well as energizing the clutch coil 42 and causing the clutch to be activated. The microswitch 96 is placed in series with the relay coil 102 such that upon axial movement of the backing plate 50 corresponding to a torque overload condition, the microswitch 96 is adjusted to be opened, deenergizing the coil 102, opening the poles 104, and thus deenergizing the clutch coil 42 and deactivating the clutch 10.

The clutch may be reactivated while at relatively high speed by merely activating the push start switch 106 once again and since the torque microswitch 96 has been reset by the cessation of overload drive through the unit, the relay coil 102 can be again energized to reestablish drive through the clutch 10. The nature of the clutch driving engagement, i.e., frictional engagement between friction faces 34 and 32 on the inner body 16 and 44 on the armature 38, enables the reestablishment of drive at relatively high rotative speeds without damage to the clutch.

The use of the spider spring having arm sections which deflect in response to the axially directed reaction forces produced by the balls 64 and the pockets 66 and 68, provides a relatively low level friction movement of the backing plate 50. The The level of friction enables a very accurate determination of the corresponding torque level and a high degree of repeatability of the point at which the torque overload arrangement is activated. The adjustability of the microswitch 96 enables a ready adjustment in the particular torque level which will trigger the torque overload arrangement. The torque overload may be extremely rapid in action since the axial movement of the backing plate 50 positions the microswitch arm 94 at a point just ready to open the microswitch 96, thus only a slight degree of axial travel of the backing plate 50 beyond the maximum torque level position is necessary in order to bring the torque overload deactivation into play. This result has been achieved without the use of separate torque sensing elements and by relatively simple components, i.e., the spider spring 70 which may be manufactured at very low cost.

Accordingly, this arrangement has been provided by a simple and low cost design as distinguished from similar arrangements which are used in the prior art described above.

It should also be noted that the clutch unit may be employed either to establish drive between rotatable members or between a rotatable member and a stationary structure, i.e., a brake unit, but the term clutch unit is intended to be used in its broad sense for the sake of brevity as both a clutch and a brake unit.

What I claim is:

1. A torque overload electromagnetically operated friction clutch for establishing drive between a pair of primary clutch members, said clutch comprising:
   a ferromagnetic inner body rotatably connected to one of said primary clutch members, said inner body having a radially extending portion formed with radial friction face portions;
   a ferromagnetic armature disposed opposite and adjacent to said inner body friction face portions, said armature having corresponding radial surfaces constituting mating friction face surface;
   means of mounting said inner body and said armature for relative axial movement to bring said friction faces into and out of frictional engagement;
   electromagnetic coil means for generating magnetic flux drawing said inner body and armature into frictional engagement;
   means for rotatably connecting said armature to said other primary clutch members, said means including:
   a backing plate disposed adjacent said armature;
   a torque booster means interconnecting said backing plate and said armature, said torque boosting means including a plurality of balls disposed in corresponding conical pockets formed in opposite radial face portions formed on said armature and said backing plate;
   means rotatably connecting said backing plate to said other primary clutch member;
   means mounted for rotation with said backing plate, for allowing limited axial movement of said backing plate away from said armature member while exerting a corresponding spring force resisting said relative axial movement and providing an axial spring force restraining the movement of said backing plate; and
   torque overload means including a means for deenergizing said electromagnetic coil means upon the attainment of a predetermined torque level through said clutch unit, said means including means responsive to a predetermined extent of said relative axial travel of said backing plate relative said armature whereby drive through said unit is discontinued.

2. The clutch according to claim 1 further including manual reset means for re-energizing said electromagnetic coil after said activation of said torque overload means.

3. The clutch according to claim 1 wherein said means for rotatably connecting said backing plate to said other of said primary clutch members consists of spider spring means including a hub section rotatably connected to said other of said primary clutch members and arm members extending radially outwardly and connected to said backing plate at the ends thereof whereby said spring force said means allowing relative axial movement comprises the axial deflectablity of said arms and which generates said corresponding resisting spring force.

4. The clutch according to claim 3 wherein said spider spring comprises a member formed of flat spring steel wherein said arms are of substantial width such as to provide an essentially rigid rotative connection between said backing plate and said other of said primary clutch members while said thin spring steel section allows said axial travel of said backing plate and said spider spring is formed with a central annular portion having an central opening formed therein formed wih a spline and wherein said other primary clutch member is formed with corresponding external spline mating with said internal spline formed on said spring steel member.

5. The clutch according to claim 4 wherein said backing plate is formed with an axially extending skirt portion, the terminal portion thereof formed with a plurality of recesses in correspondence with the number of arms formed on said spider spring member wherein said recesses receive said arms to establish said rotatable connection between said backing plate and said other of said primary clutch members.

6. The clutch according to claim 1 wherein said torque overload means sensing said axial movement of said backing plate includes a switching means having an element in engagement with a radial face formed on said backing plate.

7. The clutch according to claim 6 wherein said switching means includes an adjustable switching means wherein said switch activation is responsive to said movement of said switch element in contact with said radial face of said backing plate is adjustable whereby said torque level whereat said torque overload means is activated is adjustable.

* * * * *

UNITED STATES PATENT AND TRADEMARK OFFICE
CERTIFICATE OF CORRECTION

PATENT NO. : 4,293,060

DATED : October 6, 1981

INVENTOR(S) : Donald Leroy Miller

It is certified that error appears in the above—identified patent and that said Letters Patent is hereby corrected as shown below:

Column 1, Line 11, after the word "can" insert the word ----be----.

Column 1, Line 40, delete the word "forementioned" and insert the word ----aforementioned----.

Column 1, Line 52, delete the word "expenses" and insert the word ----expense----.

Column 3, Line 22, delete the words "with a" and insert the words ----to the----.

Column 3, Line 29, delete the words "to the" and insert the words ----with a----.

Column 3, Line 30, delete the word "are" and insert the word ----is----.

UNITED STATES PATENT AND TRADEMARK OFFICE
CERTIFICATE OF CORRECTION

PATENT NO. : 4,293,060
DATED : October 6, 1981
INVENTOR(S) : Donald Leroy Miller It is certified that error appears in the above—identified patent and that said Letters Patent is hereby corrected as shown below:

Column 5, Line 20, delete the word "The" third occurrance and insert the word ----low----.

Signed and Sealed this

Nineteenth Day of January 1982

[SEAL]

Attest:

Attesting Officer

GERALD J. MOSSINGHOFF

Commissioner of Patents and Trademarks